STOVES & FURNACES,
Dampers, Stovepipe,
292
BEST AVAILABLE COPY
E. Nott.
Damper.
Patented Jan. 29, 1833.
7,640 X
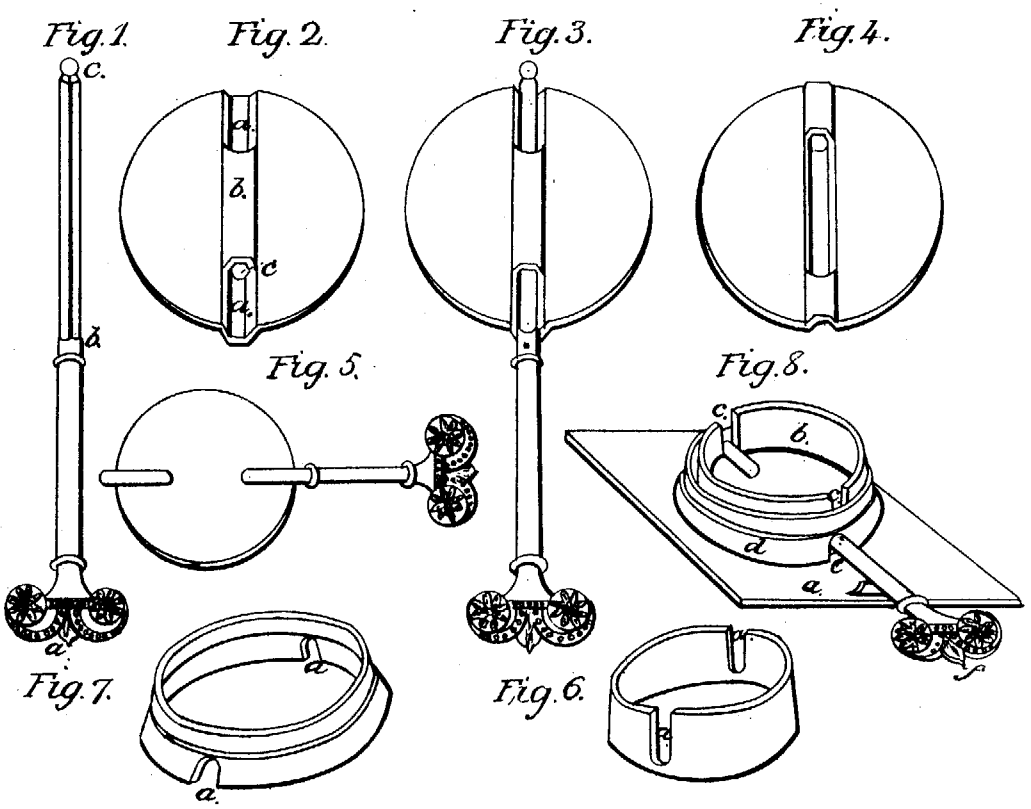

7640X June 29. 1833 201.

Eliphalet Nott.

Case "6"

Letters Patent.

The Schedule referred to in these Letters Patent and making part of the same, containing a description in the words of the said in- Eliphalet Nott himself of his improvement in the construction of the tops of stoves by a combination of sections cast separately.

Case "No. 6."

Specification of an improvement made in the construction of the tops of coal stoves by a combination of sections, either cast separately or formed by dividing the same after having been cast entire. Whereas inconvenience has arisen from the cracking of the tops of coal stoves, which tops hav- hitherto been cast entire, therefore an improvement has been introduced and the same having been tested by repeated experiments is deemed worthy of being carried into general use. which improvement consists.— In casting each top for stoves of common size in two separate sections and for very large stoves in four separate sections or if said tops are cast entire in dividing the same according to their size into two or four sections and in either case, whether cast in sections, or cast entire & divided into sections, in combining said sections in one whole; which may be effected by placing the corresponding sections together & either overlaying or under=laying the same, or both, at the lines of junction with a flat suff'iciently extended to admit severally on each side of said line, of the passing of a bolt thro' each end thereof; & thro' the correspond=ing end of each section overlaid or underlaid thereby: If the flat overlay the sections to be integrated thereby, which is preferred, as it will then cover the seam that would otherwise be exposed, it may be so formed as to resemble a vine spring=ing up from below and overspreading the integrated sections For 212. 7640X For further information reference may be had to the drawing & explanations hereunto appended.

Summary.

The improvement above contemplated, consists in preventing the tops of Anthracite coal stoves from cracking by casting the same in separate sections, or by dividing the same into sections cast entire and thereafter combining said sections together in manner aforesaid. I therefore claim as my invention & improvement the preventing of the tops of stoves from cracking, by casting the same in sections, or by dividing the same into sections when cast entire, & thereafter combining said sections in one whole as aforesaid together with the uses to which the same has been or may hereafter be applied in stoves or furnaces.

Exd. Witnesses
[illegible] C. T. Yates
D. Boyd

Eliphalet Nott

[illegible]

(Granted June 29. 1839)
[illegible]